Patented July 31, 1945

2,380,439

UNITED STATES PATENT OFFICE 2,380,439

MASS SPECTROMETER

Edmund E. Hoskins and Robert V. Langmuir, Pasadena, Calif., assignors to Consolidated Engineering Corporation, Pasadena, Calif., a corporation of California Application April 6, 1942, Serial No. 437,922

7 Claims. (Cl. 73—18)

This invention relates to methods of mass spectrometry, that is to methods of determining the amounts of ions of different mass-to-charge ratios appearing when a material under investigation is ionized.

In general mass spectrometry involves the conversion of a material under analysis into ions, the segregation or separation of these ions into ion beams according to their mass-to-charge ratios, and the measurement of the intensities of the beams to determine the rates of formation of the respective ions. The rates of formation of the respective ions vary with a large number of factors, such as the nature and energy of the ionizing agency, as well as the amount and composition of the material being analyzed. In the analysis of a material existing in gaseous or vapor form, for instance, the sample is generally ionized by bombardment with low velocity electrons at low pressure, the ions formed then being accelerated by an electric field and ions of different mass-to-charge ratios occurring in different ion beams then being successively directed upon a collector where the ions discharge, thereby producing a series of ion currents which vary in intensity according to the rates of formation of the respective ions. The mass-to-charge ratios of different ions being detected from one moment to another in the analysis, is varied by adjusting the electric and/or magnetic forces which cooperate in the separation of the ions according to their mass-to-charge ratio.

In general, two methods have been used for measuring the collected ion currents detected in a mass spectrometer.

In the first, ion beams comprising ions of predetermined mass-to-charge ratios were successively focussed on the ion collector by manual control of either the magnetic or electric segregating force. For each such setting, the collected ion current was measured by means of a suitable circuit and meter connected to the ion current collector. Such a method is slow, tedious and cumbersome. One advantage of this method however, lies in the fact that the intensities of both weak and strong ion beams may be measured by suitable adjustment of the sensitivity of the ion current measuring system.

A second method which has been used heretofore has involved automatically varying one of the segregating forces such as the electrical force and synchronously recording the amplitude of the collected ion current. While this automatic recording method has many advantages over the manual technique for operating a mass spectrometer, nevertheless it suffers from several inherent disadvantages, the most important of which is that it is not suitable for determining the mass spectrum of a material in which the number of ions of different mass-to-charge ratios occur in widely different proportions in a single run. Consequently, unless suitable precautions are taken when using this method, repeated runs are necessary with different sensitivity settings of the recording system in order to obtain indications of the amounts of different ions.

The principal object of our invention is to provide an improved recording system particularly applicable to mass spectrometry. With our new recording system we record a plurality of traces representing the same series of phenomena to different scales. Our new system of mass spectrometry combines the advantages of both the prior art systems described above, and eliminates the disadvantages of both. With our system we are able to achieve greater accuracy and speed of operation of a mass spectrometer than was obtainable heretofore and consequently effect large economies in the analysis of samples.

Our new method of mass spectrometry comprises producing a series of ion currents corresponding to the amounts of ions of different mass-to-charge ratios derived from a material under investigation, converting each ion current in the series into a plurality of corresponding measurable quantities, each bearing a different functional relation to said each ion current, thus producing a plurality of series of said quantities corresponding to ions of different mass-to-charge ratios, and determining the mass spectrum of the material from values of quantities in different series. More specifically we amplify the collected ion currents by different amounts to produce a plurality of corresponding electrical currents of widely different magnitudes, and record these electrical currents simultaneously on a common recording medium as the mass-to-charge ratio of the detected ions is varied, and substantially simultaneously record an ion current scale on the recording medium. Thus we obtain a mass spectrogram in the form of a record sheet having impressed thereon a plurality of traces representing the same mass spectrum automatically recorded to different scale factors. By measuring a recorded peak, preferably the largest, occurring among the several traces of each ion current and correcting the size of this peak in accordance with the scale factor, we are able to determine from a single recording a complete mass spectrum of a material producing ions of different mass-to-charge ratios in widely different proportions.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves in any way, to the apparatus of the present application, as we may adopt various other apparatus embodiments, utilizing the method, within the scope of the appended claims. It is also to be understood that our recording system is applicable to the measurement of other phenomena than those herein illustrated.

Referring to the drawings.

Figure 1:
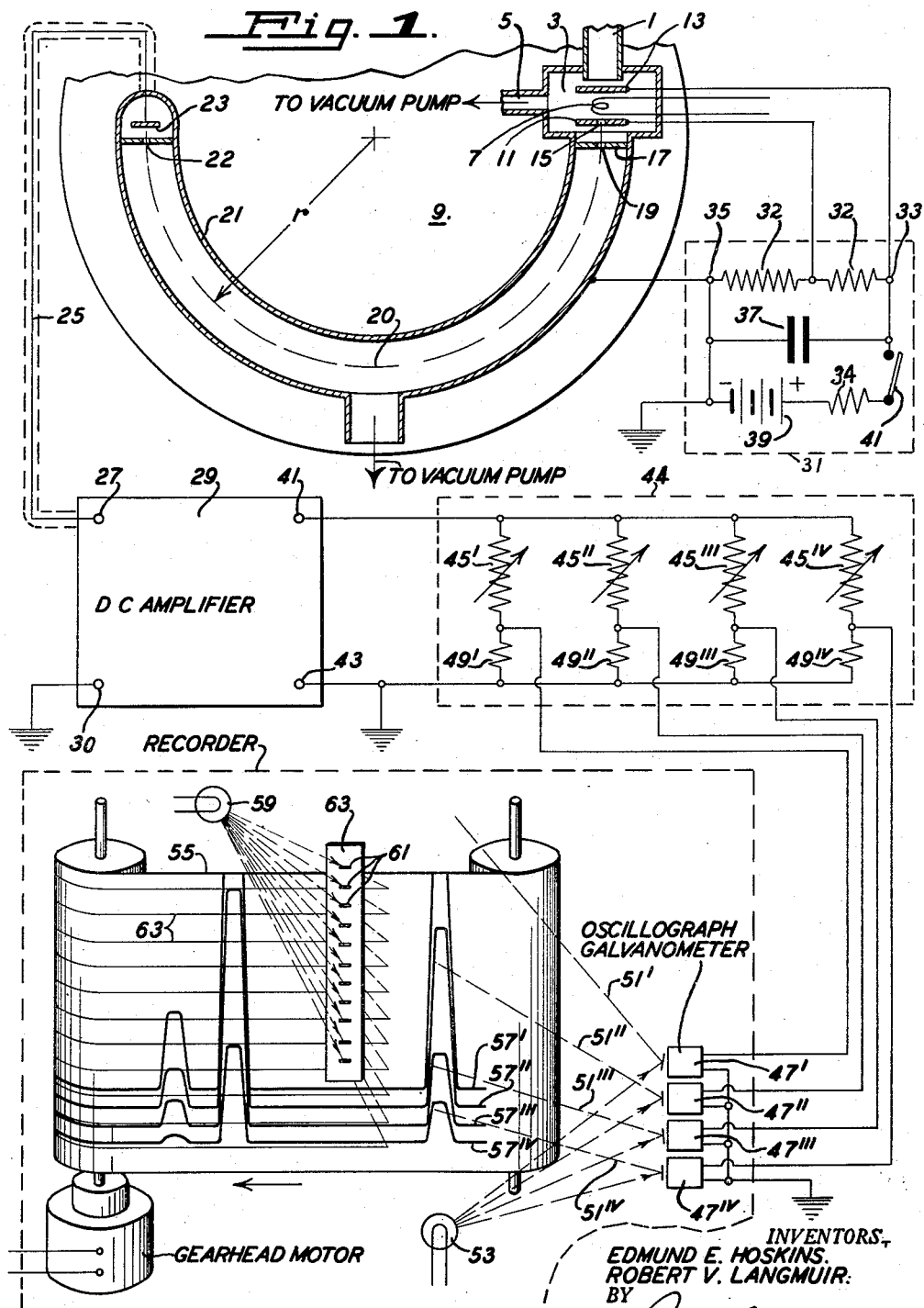
Fig. 1 is a schematic diagram of a mass spectrometer and multiple trace recorder provided with an ion current scale record.

Fig. 1 illustrates the application of our invention to a Dempster type mass spectrometer, adapted to the analysis of gaseous materials. A gas to be analyzed is flowed continuously from a sample region (not shown) through an inlet conduit 3, into an ionization chamber 3, and thence to a vacuum pump through the discharge conduit 5. Electrons emitted from a heated filament 7 in the ionization chamber are directed along a line perpendicular to the face of magnetic pole 9 by the combined action of the magnetic field which is directed downward perpendicular to the plane of the drawings, and an electric field provided by suitable electrodes (not shown).

When these electrons bombard molecules of the gas, the molecules become ionized in a manner characteristic of the gas and dependent upon the conditions of ionization. The concentrations of ions of different mass-to-charge ratio thus formed may be measured and utilized in studying the properties of the gas and in analyzing its composition. Positively charged ions are accelerated toward first slit electrode 11 by action of a small electrical potential which maintains first slit electrode 11 negative with respect to pusher electrode 13. Some of the accelerated ions pass through a narrow slit 15 in first slit electrode 11, and are thereupon highly accelerated by a large negative potential maintained between second slit electrode 17, and first slit electrode 11. Some of the accelerated ions which have passed through first slit 15 then pass through a second slit 19 in second slit electrode 17.

The potential between electrodes 11 and 17 may be varied from several volts to several thousand volts. The rate at which ions of a particular mass-to-charge ratio pass through the slits 15 and 19 is a measure of the rate of formation of such ions in the ionization chamber, and is also a measure of the concentration of such ions present there.

Positive ions passing through second slit 19 follow circular paths owing to the action of the magnetic field.

Ions of a given mass-to-charge ratio follow one curved path, while those of a larger mass-to-charge ratio follow another curved path of greater radius forming separate ion beams. In this spectrometer, only ions having a particular mass-to-charge ratio corresponding to the radius of the semi-circular path 20 in the center of analyzer tube 21 will pass through exit slit 22, about 180° from slit 19, and strike ion collector 23. Ions striking said ion collector 23 there give up their charge to produce an ion current corresponding to the rate of formation of ions of that particular mass-to-charge ratio being formed in the ionization chamber. This current passes through shielded lead 25 into input terminal 27 of D.-C. amplifier 29 and thence to ground 30.

In order to produce variations in the ion collector current corresponding to the respective amounts of ions of different mass-to-charge ratios being formed in the ionization chamber, the electric accelerating potential to which the ions are subjected is varied automatically in some predetermined manner. A control circuit 31 for this purpose, embodying the principles disclosed in copending patent application Serial No. 494,807, filed July 15, 1943, is shown in Fig. 1.

A potentiometer 32 of fixed resistance in said control circuit has its positive end 33 connected to pusher electrode 13 and its negative end 35 connected to second slit electrode 17 through the metallic analyzer tube 21, and to ground. An intermediate point of the potentiometer near the positive end is connected to first slit electrode 11. Condenser 37 is connected across said potentiometer. Battery 39 having its negative pole grounded may be connected to potentiometer end 33 through resistor 34 and switch 41. After condenser 37 has been charged to a standard potential by closing key 41, thus establishing predetermined positive potentials on electrodes 11 and 13, said key may then be opened to discharge the condenser through potentiometer 32, thus causing the potentials of electrodes 11 and 13 to decrease as an exponential function of time depending upon the time constant (RC) of the control circuit.

As the accelerating potentials on electrodes 11 and 13 decrease, beams of ions of larger and larger mass-to-charge ratio are successively focussed at exit slit 22 and directed against the ion collector 23. As ions of different mass-to-charge ratios sweep past the exit slit 22, variations in the collected ion current applied to the D.-C. amplifier 29 input occur. The magnitudes of these collected current variations correspond to the rates of formation of different corresponding ions. Expressed in other words, as ions of different mass-to-charge ratios successively impinge ion collector 23, a series of ion currents is produced in which each ion current corresponds to the amount of ions of the corresponding mass-to-charge ratios. The intensities of these ion currents is known as the mass spectrum of the sample.

According to our invention, we convert the series of ion currents into a plurality of series of corresponding displacements of different magnitudes and record the magnitudes of the displacements in a coordinated manner as a function of time.

While the different recorded displacements may be produced by mechanical or optical means, we prefer to produce the different displacements by dividing the current output of the direct current amplifier 29 into a plurality of proportional currents and apply these currents to equally sensitive galvanometers of a recording oscillograph.

The amplified ion current may be divided into predetermined proportional parts by applying the current flowing between the D.-C. amplifier 29 output terminals 41, and 43, to the current dividing network 44. As shown, there are four paths by which parts of the amplified current may pass from D.-C. amplifier output terminal 41 to the other D.-C. amplifier output terminal 43 which is grounded. The four paths comprise respectively resistance 45' and galvanometer 47'; resistance 45'' and galvanometer 47''; resistance 45''', and galvanometer 47'''; and resistance 45iv, and galvanometer 47iv. The four resistances 49', 49'', 49''', and 49iv connected across galvanometers 47', 47'', 47''', and 47iv respectively serve to damp the galvanometers electrically.

By suitable adjustment of the values of resistors 45', 45'', 45''', and 45iv the galvanometers 47', 47'', 47''', and 47iv, respectively may be made unequally sensitive to any ion current applied to the D.-C. amplifier input.

As the mirrors of said galvanometers are displaced from their neutral positions in response to changes in galvanometer current, the mirror displacements are optically amplified by means of light rays 51', 51'', 51''', and 51iv respectively, from light source 53, which rays are reflected onto a moving recording medium in the form of a strip of photographic paper 55, where the displacements are recorded as corresponding latent traces 57', 57'', 57''', and 57iv as functions of time. As indicated by the latent traces, a peak galvanometer displacement is produced on each trace for each ion current detected by the amplifier. However, only displacements within the dimensional range of the recording medium are recorded in full.

Simultanously with the recording of the galvanometer currents, light from a source 59 is projected through narrow rectangular slots 61 in mask 63, said slots lying in lines parallel to the direction of paper 55 movement onto the photographic paper to provide indicia in the form of thin trace displacement scale lines 63. As these scale lines are made at the time of recording, and close to the recording position errors due to variations in paper width, warping or other dimensional changes in the paper are greatly reduced.

After development this recording medium results in a multiple-trace record of the mass spectrum. Peak displacements which are simultaneously recorded on the respective traces represent the same value of ion current but to different scales. By recording indicia 63 thereon substantially simultaneously with the currents, a permanent scale indicating ion rate formation is provided. These indicia permit accurate measurements of ion currents irrespective of any shrinkage to which the photographic paper may be subjected during development or storage.

The galvanometer elements 47', to 47iv and the light source 53 are preferably so positioned with respect to the recording paper that the respective recorded traces appear in simple time-coordinated manner one above the other on the paper, with the trace displacements parallel to the paper width, and with the more sensitive traces on the displacement side of the less sensitive traces.

Figure 2:
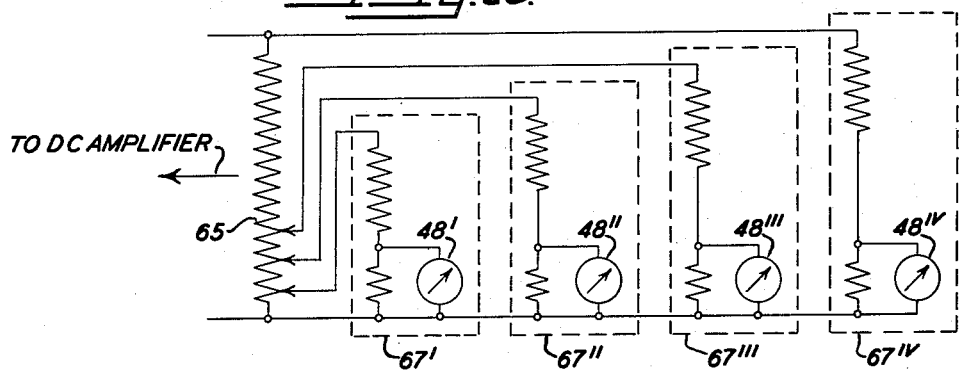
Fig. 2 is a wiring diagram of a potential divider useful in our invention.

Fig. 2 illustrates another dividing circuit by means of which recordable traces of the same mass spectrum may be obtained. In this case the output of the D.-C. amplifier is passed through resistor 65, and four potentiometers 67', 67'', 67''', and 67iv of equal inherent sensitivity are connected to four different points of resistor 65 to provide readings on the respective galvanometers 48', 48'', 48''', 48iv which are suitable for different ranges of ion current. The indicating elements of the potentiometers may be incorporated if desired in a multiple-element recorder such as that shown in Fig. 1. Though the system shown in Fig. 2 includes potentiometers, it also may be considered a current dividing network.

It is to be understood of course, that numerous ways of producing a plurality of indications of the same mass spectrum to different scales may be provided. Not only may series and parallel arrangements of circuits such as those disclosed in Figs. 1 and 2 be used, but for example, we may adopt a recording system having but a single recording element, the sensitivity of which is cyclically changed to predetermined values according to methods well known in the art. However, we prefer to use a system having a plurality of recording elements primarily because the multiple-element recording system is more rapid in operation, and is simpler and more rugged.

In practice the D.-C. amplifier is so designed that no current flows in the output circuit when no ions are being produced in the mass spectrometer. Means for achieving this result are well known in the amplifier art and need not be described here.

Figure 3:
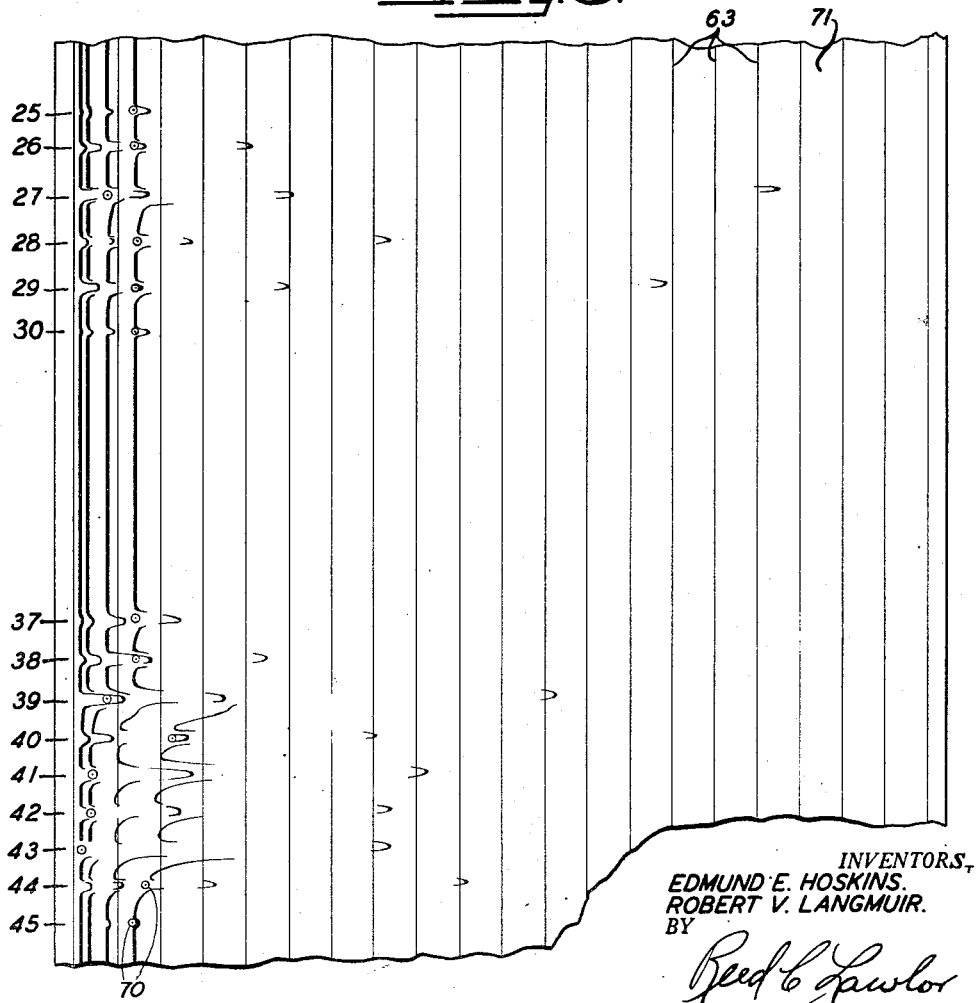
Fig. 3 shows a typical record as obtained with the apparatus of Fig. 1.

Fig. 3 is a section of a four-trace mass spectrogram obtained with the apparatus of Fig. 1. Ion current scale lines 63 extend in a direction parallel to the time axis, or direction of paper movement. The four traces are records of the same mass spectrum automatically made to different scales factors.

It will be noted that in the actual record only the zero or base lines and the tips of the peaks appear. The steep sides do not appear on the large peaks because of insufficient exposure of the photographic paper due to the rapid galvanometer spot motion during this part of the recording. However, this causes no particular inconvenience since the base part of the trace corresponding to any peak is readily identified. The galvanometer displacements are determined by measurement of the distance from a peak to the points in the center of small circles 70 beneath the peaks through which the base lines would pass. In order to reduce displacement readings measured on the different traces to a common basis, the displacements measured on the traces must be multiplied by the scale factors 1, 3, 10, and 30, thus determining what the values of these displacements would be on the most sensitive galvanometer.

*Table*

| m | Measured peak | Scale factor | Mass spectrum |
|---|---|---|---|
| 25 | 0.4 | 1 | 0.4 |
| 26 | 2.7 | 1 | 2.7 |
| 27 | 15.7 | 3 | 47.1 |
| 28 | 6.0 | 1 | 6.0 |
| 29 | 12.4 | 1 | 12.4 |
| 30 | 0.3 | 1 | 0.3 |
| 37 | 1.1 | 1 | 1.1 |
| 38 | 3.1 | 1 | 3.1 |
| 39 | 10.5 | 3 | 31.5 |
| 40 | 4.7 | 1 | 4.7 |
| 41 | 7.9 | 10 | 79.0 |
| 42 | 7.0 | 10 | 70.0 |
| 43 | 7.2 | 30 | 216.0 |
| 44 | 7.6 | 1 | 7.6 |
| 45 | 0.1 | 1 | 0.1 |

The numbers 26, 27, 28, 29, 30, 37, 38, 39, 40, 41, 42, 43, 44 and 45 to the left of the record indicate the respective mass-to-charge ratios of the ions producing the ion currents to which the respective peaks on the recorded traces correspond. In practice, to determine the mass spectrum from such a spectrogram, the largest peak within the scale range of the recording paper recorded for each value of mass-to-charge ratio is measured and multiplied by the corresponding scale factor to reduce the measurements to a common scale. The table is a summary of such computations of the mass spectrum obtained from the multiple-trace mass spectrogram shown in Fig. 3. In this table column 1 represents the mass-to-charge ratio of the ions. Column 2 is the measured displacement of the largest recorded peak representing the ion current corresponding to such ions. Column 3 represents the scale factor of the trace on which the corresponding largest peak is measured. Column 4 represents the product of the observed peak by the corresponding scale factor, and consequently represents the peak height (in number of scale divisions) which would be recorded with the most sensitive galvanometer if its range were not limited by the physical dimensions of the recording apparatus. When the values in column 4 are multiplied by suitable factors, the respective ion currents, ion beam intensities, ion formation rates, or ion concentrations corresponding to the various peaks may be obtained.

While we prefer to record traces in which the displacements bear different constant ratios to the collected ion current, it is clear that some of the advantages of our invention can be obtained by producing displacements which bear other functional relations to the ion currents. By utilizing suitable modifications of the amplifier, dividing network, and galvanometer elements, displacements which are proportional to other functions of the detected ion current may be obtained. Such functions may be exponential, hyperbolic, trigonometric, or logarithmic, if desired.

Thus it is seen that by generating a time-variable current in which the current variations correspond to the respective rates of formation of ions of different mass-to-charge ratios, converting the variable current into a plurality of corresponding time-variable electric currents of different magnitudes, and recording these electric currents, we provide a system of mass spectrometry which greatly facilitates the analysis of samples.

We claim:

1. In a mass spectrometer, the combination which comprises means for segregating under the influence of a force ions according to their mass-to-charge ratios into a plurality of beams, an ion collector wherein ion currents are produced by impinging ion beams, means for automatically varying said force to successively focus the ion beams on the collector, means for converting said ion currents into a corresponding electric current varying in amplitude as a function of time in accordance with the strengths of the ion currents, a plurality of means for amplifying said electric current in different amounts to produce a plurality of amplified currents, and means for recording the amplified currents as time coordinated traces each representative of the spectrum of the sample being analyzed.

2. In a mass spectrometer, the combination which comprises an ion current collector, control means for successively rendering the collector responsive to ions of different mass-to-charge ratios to produce a corresponding succession of ion currents, means for automatically varying the control means to cause the collector successively to respond to ions of different mass-to-charge ratios, a multiple trace recorder, and means connecting the collector to the recorder for producing a plurality of trace records of said ion currents to different scales.

3. In a mass spectrometer, the combination which comprises means for segregating ions according to their mass-to-charge ratios, an ion collector, automatic means for successively focussing the segregated ions of different mass-to-charge ratios on the collector, a multiple-trace recorder, and means for recording thereon each of the ion currents in a plurality of scales.

4. Apparatus according to claim 3, provided with a single recording medium upon which the multiple-trace recorder operates.

5. Apparatus according to claim 3, provided with a recording medium and means for recording thereon an ion current scale simultaneous with the recording of the ion currents.

6. In a mass spectrometer, the combination which comprises means for segregating ions according to their mass-to-charge ratios, an ion collector, automatic means for successively focussing the segregated ions on the collector to produce ion currents, and a plurality of ion current meters connected to the collector and adapted to indicate an ion current simultaneously at a plurality of scales.

7. In a mass spectrometer, the combination which comprises means for segregating ions according to their mass-to-charge ratios, an ion collector, automatic means for successively focussing the segregated ions on the collector to produce ion currents, a plurality of ion current meters, and a corresponding plurality of electrical networks connecting the meters to the collector, the constants of the networks being selected to render the meters unequally sensitive to the ion currents.

EDMUND E. HOSKINS.
ROBERT V. LANGMUIR.